US011802175B2

(12) United States Patent
Yokoyama et al.

(10) Patent No.: US 11,802,175 B2
(45) Date of Patent: Oct. 31, 2023

(54) EPOXY RESIN MODIFIED WITH POLYURETHANE IN LOW CONCENTRATION, PRODUCTION METHOD THEREFOR, EPOXY RESIN COMPOSITION, AND CURED OBJECT

(71) Applicant: NIPPON STEEL CHEMICAL & MATERIAL CO., LTD., Tokyo (JP)

(72) Inventors: Naoki Yokoyama, Tokyo (JP); Tetsuya Nakanishi, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 637 days.

(21) Appl. No.: 17/043,045

(22) PCT Filed: Mar. 15, 2019

(86) PCT No.: PCT/JP2019/010780
§ 371 (c)(1),
(2) Date: Sep. 29, 2020

(87) PCT Pub. No.: WO2019/188399
PCT Pub. Date: Oct. 3, 2019

(65) Prior Publication Data
US 2021/0047458 A1    Feb. 18, 2021

(30) Foreign Application Priority Data

Mar. 30, 2018  (JP) ................................ 2018-068144

(51) Int. Cl.
C08G 18/58  (2006.01)
C08G 18/18  (2006.01)
C08G 18/32  (2006.01)
C08G 18/40  (2006.01)
C08G 18/48  (2006.01)
C08G 18/66  (2006.01)
C08G 18/76  (2006.01)

(52) U.S. Cl.
CPC .......... *C08G 18/58* (2013.01); *C08G 18/185* (2013.01); *C08G 18/3206* (2013.01); *C08G 18/4045* (2013.01); *C08G 18/4825* (2013.01); *C08G 18/6674* (2013.01); *C08G 18/7671* (2013.01)

(58) Field of Classification Search
CPC ..... C08G 18/58; C08G 18/4825; C08G 71/04
See application file for complete search history.

(56) References Cited

U.S. PATENT DOCUMENTS

| 5,447,973 | A  | 9/1995 | Yamada et al. |
| 2010/0035041 | A1 | 2/2010 | Kramer et al. |
| 2017/0198085 | A1 | 7/2017 | Yamada et al. |
| 2021/0047458 | A1* | 2/2021 | Yokoyama ........... C08G 18/185 |

FOREIGN PATENT DOCUMENTS

| JP | H04-145185 A | 5/1992 |
| JP | H06-100806 A | 4/1994 |
| JP | H06-107773 A | 4/1994 |
| JP | H06-271827 A | 9/1994 |
| JP | H06-329755 A | 11/1994 |
| JP | H08-20706 A | 1/1996 |
| JP | H08-311152 A | 11/1996 |
| JP | 2007-224144 A | 9/2007 |
| JP | 2007-284467 A | 11/2007 |
| JP | 2007-284474 A | 11/2007 |
| JP | 2010-507709 A | 3/2010 |
| JP | 2012-219223 A | 11/2012 |
| JP | 2013-073064 A | 4/2013 |
| JP | 2014-077074 A | 5/2014 |
| JP | 2016-011409 A | 1/2016 |
| WO | 2013/034867 A1 | 3/2013 |
| WO | 2015/186707 A1 | 12/2015 |

OTHER PUBLICATIONS

International Preliminary Report on Patentability (Chapter I of the Patent Cooperation Treaty) dated Oct. 6, 2020, issued for PCT/JP2019/010780.
English Translation of the Written Opinion of the International Searching Authority dated Sep. 16, 2020, issued for PCT/JP2019/010780.
International Search Report dated Apr. 9, 2019, issued for PCT/JP2019/010780.

* cited by examiner

*Primary Examiner* — Gregory Listvoyb
(74) *Attorney, Agent, or Firm* — Locke Lord LLP

(57) ABSTRACT

Provided is a polyurethane-modified epoxy resin having favorable processing operability in casting, impregnation, or the like in a composition state, a method for producing the same, and a composition of the same. Provided is a low-concentration polyurethane-modified epoxy resin including: a polyurethane having a secondary hydroxyl group-containing bisphenol-based epoxy resin that has an epoxy equivalent of 150 to 200 g/eq and a hydroxyl equivalent of 2,000 to 2,600 g/eq, added to both terminals and/or a single terminal thereof, in which the polyurethane is a modified product of the epoxy resin that is modified with a middle- and high-molecular-weight polyol compound having an Mn of 200 or larger, a polyisocyanate compound, and a low-molecular-weight polyol compound as a chain extender having an Mn of less than 200, and the epoxy resin is used in an amount of 68 to 92 weight % based on a total amount of the components.

5 Claims, No Drawings

EPOXY RESIN MODIFIED WITH POLYURETHANE IN LOW CONCENTRATION, PRODUCTION METHOD THEREFOR, EPOXY RESIN COMPOSITION, AND CURED OBJECT

TECHNICAL FIELD

The present invention relates to a novel low-concentration polyurethane-modified epoxy resin, a polyurethane-modified epoxy resin composition obtained by formulating a curing promoter, a curing agent, and a polyurethane-unmodified epoxy resin for adjusting the concentration of polyurethane with the low-concentration polyurethane-modified epoxy resin, and a cured product of the polyurethane-modified epoxy resin composition.

BACKGROUND ART

Epoxy resins, from which various cured product characteristics such as excellent processability, high heat resistance, high insulation reliability, high rigidity, high adhesiveness, and high corrosion resistance are obtained, are used in large amounts in various applications such as heavy anticorrosion paints, structural adhesives, matrix resins of composite materials such as CFRP, and electrical insulating materials (castings, impregnations, laminated plates, and encapsulants).

On the other hand, since epoxy resin-cured products have low elongation at break, low fracture toughness, and a low peel strength, these characteristics have been improved by various modifications such as rubber modification or polyurethane modification in the applications of structural adhesives or matrix resins of composite materials which require the above-described characteristics.

An epoxy resin composition obtained by formulating a specific epoxy resin such as a polyoxyalkylene diglycidyl ether with a polyurethane-modified epoxy resin obtained by formulation with and synthesis from a polypropylene diol and isophorone diisocyanate in the presence of bisphenol A-type epoxy resins containing hydroxyl groups so that the molar ratio of NCO groups in the isophorone diisocyanate to the total number of OH groups in the polypropylene diol and the bisphenol A-type epoxy resin becomes NCO/OH=1.0 is disclosed in PTL 1 and PTL 2 for structural adhesives for vehicles having high shear strength, peel strength, and torsional shear strength and excellent adhesiveness and impact resistance.

However, there is no disclosure regarding the above-described polyurethane-modified epoxy resin that resin characteristics and cured product characteristics are controlled by defining the charging concentration of epoxy resin which contains hydroxyl groups and is incorporated during synthesis. In addition, there is no disclosure of data on the viscosity of the composition, elongation at break and fracture toughness of a cured product, and a glass transition temperature.

There is a disclosure in PTL 3 that a resin composition containing a urethane-modified epoxy resin, obtained by obtaining a urethane prepolymer by causing a reaction by incorporating a specific diol compound and diphenylmethane diisocyanate into a bisphenol A-type epoxy resin, and incorporating 1,4-butanediol as a chain extender into the urethane prepolymer to form a polyurethane, becomes a cured product which has a high fracture toughness value and is useful for electrical and electronic applications or building material applications.

However, similarly, there is also no disclosure that in the above-described urethane-modified epoxy resin characteristics and cured product characteristics are controlled by defining the concentration of epoxy resin which contains hydroxyl groups and is incorporated during synthesis. In addition, data on the viscosity of the composition or elongation at break of a cured product are not disclosed. There is a disclosure of data on fracture toughness and a glass transition temperature, and a significant improvement effect for the former is able to be recognized. However, regarding the latter, the epoxy resin-cured product does not have sufficient heat resistance at a low temperature.

In addition, there is a disclosure of a urethane-modified epoxy resin in PTL 4. However, in this urethane-modified epoxy resin, there is a problem in that the present inventors cannot find sufficient improvement in fracture toughness in a composition thereof with a certain curing agent.

CITATION LIST

Patent Literature

[PTL 1] Japanese Patent Application Publication No. 2007-284467
[PTL 2] Japanese Patent Application Publication No. 2007-284474
[PTL 3] Japanese Patent Application Publication No. 2007-224144
[PTL 4] Japanese Patent Application Publication No. 2016-11409

SUMMARY OF INVENTION

The present invention provides a novel polyurethane-modified epoxy resin in which a viscosity of an epoxy resin composition can be set to 60 Pa·s or less at 25° C., at which mold casting in casting materials, fiber impregnation in composite materials, and application of a structural adhesive to an adherend can each be performed, elongation at break and fracture toughness of a cured product can be respectively set to 2.5% or more and 1.5 MPa·m$^{0.5}$ or more to improve fatigue resistance or peel strength of casting materials, composite materials, and structural adhesives, and a glass transition temperature can be set to 130° C. or higher to maintain heat resistance, a resin composition thereof, and a cured product thereof.

The present invention is a low-concentration polyurethane-modified epoxy resin including a polyurethane having a bisphenol-based epoxy resin (a) represented by the following Formula (1) added to both terminals and/or a single terminal thereof, in which the epoxy resin (a) having an epoxy equivalent of 150 to 200 g/eq and a hydroxyl equivalent of 2,000 to 2,600 g/eq is modified with a middle- and high-molecular-weight polyol compound (b) having a number average molecular weight of 200 or larger, a polyisocyanate compound (c), and a low-molecular-weight polyol compound (d) as a chain extender having a number average molecular weight of less than 200, it is obtained such that the epoxy resin (a) is used in an amount of 68 to 92 weight % based on a total amount of the components (a), (b), (c), and (d), the middle- and high-molecular-weight polyol compound (b) and the polyisocyanate compound (c) are used in such amounts that a molar ratio of OH groups in the component (b) to NCO groups in the component (c) is within a range of 1:2 to 1:30 and are reacted with each other in the presence of the epoxy resin (a) to produce a urethane prepolymer (P), and then, the low-molecular-weight polyol compound (d) is added to the urethane prepolymer (P) so that a molar ratio of NCO groups in the urethane prepolymer (P) to OH groups in the low-molecular-weight polyol compound (d) is within a range of 0.9:1 to 1:0.9 to cause a polyurethane reaction.

[C1]

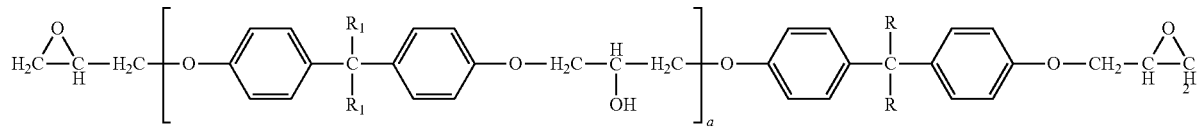

(1)

Here, R and $R_1$ each independently represent H or a methyl group, and a is a number of 0 to 10.

In addition, the present invention is a method for producing a low-concentration polyurethane-modified epoxy resin, the method including: using 68 to 92 weight % of the bisphenol-based epoxy resin (a) having an epoxy equivalent of 150 to 200 g/eq and a hydroxyl equivalent of 2,000 to 2,600 g/eq, based on a total amount of the epoxy resin (a), a middle- and high-molecular-weight polyol compound (b) having a number average molecular weight of 200 or larger, a polyisocyanate compound (c), and a low-molecular-weight polyol compound (d) as a chain extender having a number average molecular weight of less than 200; using the middle- and high-molecular-weight polyol compound (b) and the polyisocyanate compound (c) in such amounts that a molar ratio of OH groups in the component (b) to NCO groups in the component (c) is within a range of 1:2 to 1:30 and reacting the middle- and high-molecular-weight polyol compound with the polyisocyanate compound in the presence of the epoxy resin (a) to produce a urethane prepolymer (P) of which both terminals and/or a single terminal are sealed with the epoxy resin (a); and subsequently adding the low-molecular-weight polyol compound (d) to the urethane prepolymer (P) so that a molar ratio of NCO groups in the urethane prepolymer (P) to OH groups in the low-molecular-weight polyol compound (d) is within a range of 0.9:1 to 1:0.9 to cause a polyurethane reaction.

In addition, the present invention is an epoxy resin composition obtained by formulating a polyurethane-unmodified epoxy resin (e), a curing agent (f), and a curing promoter (g) with the above-described low-concentration polyurethane-modified epoxy resin, in which a weight concentration of polyurethane components (a total amount of a polyol compound (b), a polyisocyanate compound (c), and a low-molecular-weight polyol compound (d)) (hereinafter, referred to as a concentration of polyurethane components) is 5.0 to 17.0 weight %.

In the above-described epoxy resin composition, it is suitable that the curing agent (f) be dicyandiamide.

Furthermore, the present invention is an epoxy resin-cured product obtained by curing the above-described epoxy resin composition.

In the low-concentration polyurethane-modified epoxy resin of the present invention, the viscosity of a resin composition, in which the low-concentration polyurethane-modified epoxy resin is used, prior to curing can be controlled such that it is within a range where processability is not inhibited, a resin composition having a small change in the viscosity of the resin composition with time, that is, having excellent storage stability can be prepared, both elongation at break and fracture toughness of a cured product can be improved, and a decrease in glass transition temperature can be suppressed. In particular, the epoxy resin composition of the present invention exhibits such an effect when dicyandiamide is used as a curing agent. Accordingly, the epoxy resin composition and the cured product of the present invention are suitable for matrices for composite materials, adhesives, coating materials, electric and electronic materials, and the like.

DESCRIPTION OF EMBODIMENTS

The low-concentration polyurethane-modified epoxy resin of the present invention can be produced by reacting the above-described epoxy resin (a), the middle- and high-molecular-weight polyol compound (b), the polyisocyanate compound (c), and the low-molecular-weight polyol compound (d) with each other.

Compounds represented by any of the following Formulae (2) to (11) can be used as the middle- and high-molecular-weight polyol compound (b), compounds represented by the following Formula (12) can be used as the polyisocyanate compound (c), and compounds represented by the following Formula (13) can be used as the low-molecular-weight polyol compound (d). In this case, each of the components (b), (c), and (d) can be used alone or in combination of two or more thereof.

[C2]

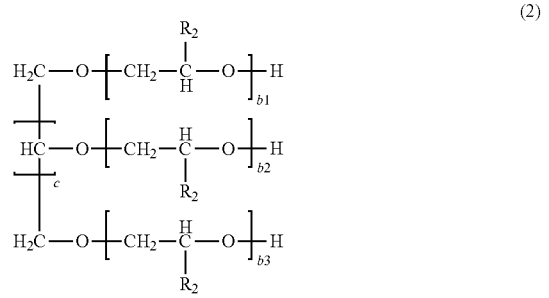

(2)

Here, $R_2$ is H or a methyl group, b1, b2, and b3 are independently a number of 1 to 50, and c is a number of 0 or 1.

[C3]

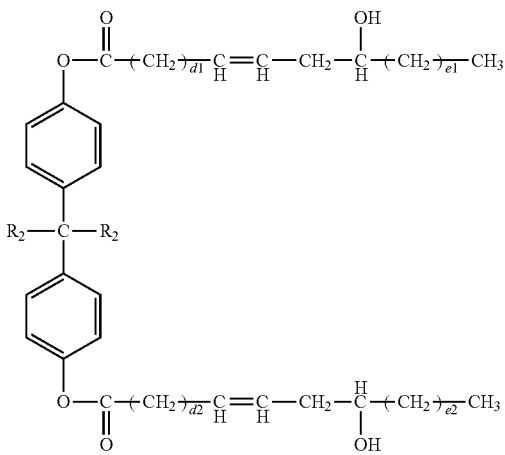
(3)

Here, $R_2$ is H or a methyl group, and d1, d2, e1, and e2 are independently a number of 1 to 20.

[C4]

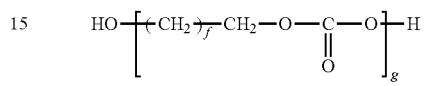
(4)

Here, f is independently a number of 1 to 20, and g is a number of 1 to 50.

[C5]

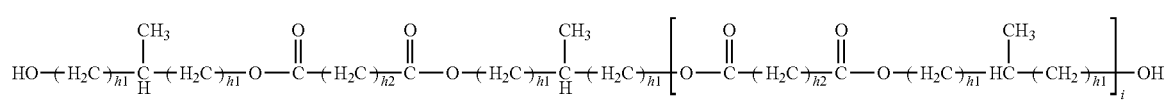
(5)

Here, h1 and h2 are independently a number of 1 to 20, and i is a number of 1 to 50.

[C6]

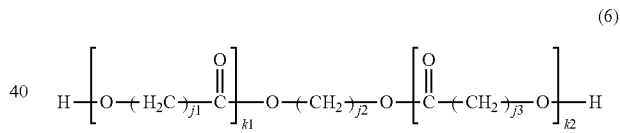
(6)

Here, j1, j2, and j3 are independently a number of 1 to 20, and k1 and k2 are independently a number of 1 to 50.

[C7]

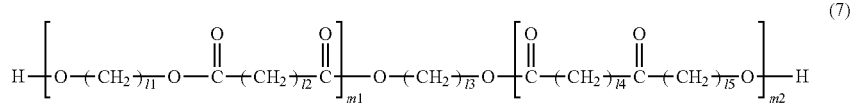
(7)

Here, l1, l2, l3, l4, and l5 are independently a number of 1 to 20, and m1 and m2 are independently a number of 1 to 50.

[C8]

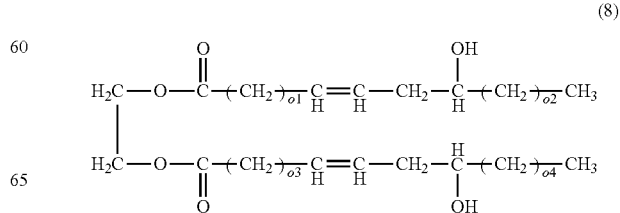
(8)

Here, o1, o2, o3, and o4 are independently a number of 1 to 20.

[C9]

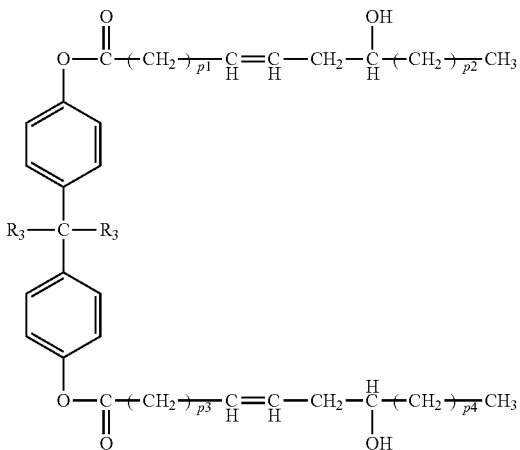
(9)

Here, $R_3$ is H or a methyl group, and p1, p2, p3, and p4 are independently a number of 1 to 20.

[C10]

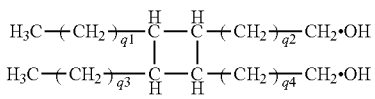
(10)

Here, q1, q2, q3, and q4 are independently a number of 1 to 20.

[C11]

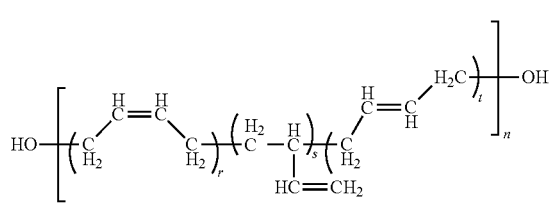
(11)

Here, r, s, and t are independently a number of 1 to 20, and n is a number of 1 to 50.

[C12]

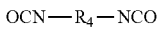
(12)

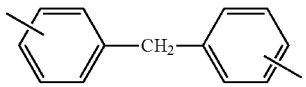
(12a)

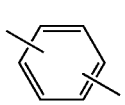
(12b)

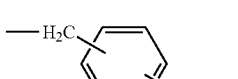
(12c)

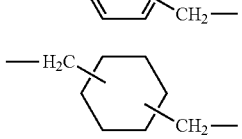
(12d)

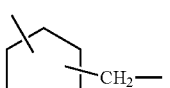
(12e)

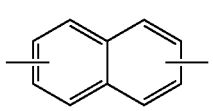
(12f)

Here, $R_4$ in Formula 12 is a divalent group selected from Formulae 12a to 12f.

[C13]

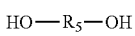
(13)

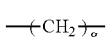
(13a)

Here, in Formula 13, $R_5$ is an alkylene group represented by Formula 13a, and g is a number of 1 to 10.

In particular, it is preferable that the epoxy resin (a) be a bisphenol A-type epoxy resin represented by the following Formula (14) or a bisphenol F-type epoxy resin represented by the following Formula (15), the middle- and high-molecular-weight polyol compound (b) be a polypropylene glycol represented by the following Formula (16), the low-molecular-weight polyol compound (d) be 1,4-butanediol represented by the following Formula (17), and the polyisocyanate compound (c) be 4,4'-diphenylmethane diisocyanate represented by the following Formula (18).

[C14]

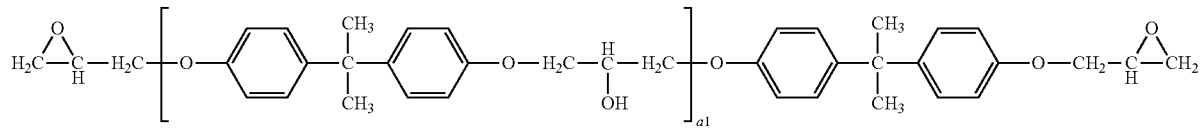
(14)

Here, a1 is a number of 0 to 10.

[C15]

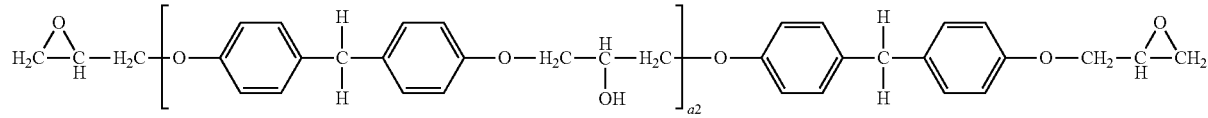
(15)

Here, a2 is a number of 0 to 10.

[C16]

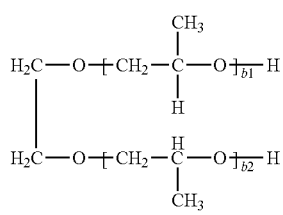
(16)

Here, b1 and b2 are independently a number of 1 to 50.

[C17]

(17)

[C18]

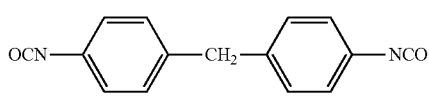
(18)

The epoxy resin (a) of the present invention is a secondary hydroxyl group-containing bisphenol-based epoxy resin which is represented by the Formula (1) shown above and has an epoxy equivalent of 150 to 200 g/eq and a hydroxyl equivalent of 2,000 to 2,600 g/eq. $R_1$ in Formula (1) is a hydrogen atom or a methyl group. A preferred epoxy resin (a) is a bisphenol A-type epoxy resin represented by the Formula (14) shown above or a bisphenol F-type epoxy resin represented by the Formula (15) shown above.

In the formula, a is a number of 0 to 10. When an epoxy resin has a molecular weight distribution, an average value (number-average value) should result in being within the above-described range. This a is determined so as to have the above-described epoxy equivalent and hydroxyl equivalent.

The middle- and high-molecular-weight polyol compound (b) has a number average molecular weight of 200 or larger and a molecular structure of any of the Formulae (2) to (11) shown above. A preferred polyol compound (b) is the polypropylene glycol represented by the Formula (16) shown above.

The polyisocyanate compound (c) is represented by the Formula (12) shown above. Here, $R_2$ is a divalent group selected from the Formulae (12a) to (12f) shown above. A preferred polyisocyanate compound is represented by the Formula (17) shown above.

The low-molecular-weight polyol compound (d) is a polyol compound which is represented by the Formula (13) shown above and has a number average molecular weight of less than 200. This is used as a chain extender. Here, $R_3$ is an alkylene group represented by Formula (13a), and g is a number (integer) of 1 to 10.

An OH group in the epoxy resin (a) is a secondary OH group mainly contained in an epoxy resin having a polymerization degree of 1 (referred to as an "(n=1) form". In a case where an epoxy resin having a polymerization degree of 2 or more (referred to as an "(n>1) form") is contained, the epoxy resin similarly contains a secondary OH group as well. Hereinafter, the (n=1) form and the (n>1) form are collectively referred to as an "(n≥1) form".

On the other hand, an OH group in the polyol compound (b) is a primary OH group. Therefore, in a case where the epoxy resin (a), the polyol compound (b), and the polyisocyanate compound (c) are incorporated to cause a reaction therebetween, the primary OH groups in the polyol compound (b) and the NCO groups in the polyisocyanate compound (c) preferentially react with each other.

In a case where a molar ratio (b):(c) of the primary OH groups in the polyol compound (b) to the NCO groups in the polyisocyanate compound (c) is within a range of 1:2 to 1:30, an NCO group-terminated urethane prepolymer (P1) having a low molecular weight is produced. Thereafter, it is thought that secondary OH groups of (n≥1) forms in an epoxy resin (a) react with some terminal NCO groups in the urethane prepolymer (P1) to form a urethane bond, and the (n≥1) forms in the epoxy resin (a) are added to both terminals or a single terminal of the urethane prepolymer to form a urethane prepolymer (P2).

That is, it is thought that a urethane prepolymer (P) is a mixture of the NCO group-terminated urethane prepolymer (P1) and the urethane prepolymer (P2) obtained by adding (n≥1) forms in the epoxy resin (a) to both terminals or a single terminal of the P1. Since the molar proportion of the NCO groups is high and a large excess amount of epoxy resin is used, it is thought that a urethane prepolymer (P2) having epoxy resins added to both terminals thereof is mainly produced.

In is thought that, as the proportion of the epoxy resin (a) incorporated is increased, the amount of urethane prepolymer (P2) of which both terminals or a single terminal are sealed with the (n≥1) form in the epoxy resin (a) and the terminal NCO groups are consumed, and which does not react with the low-molecular-weight polyol compound (d) that is a chain extender increases, the initial proportion of the urethane prepolymer (P1) of which terminals are NCO groups decreases, and the production amount of polyurethane produced by a reaction between the terminal NCO groups in the P1 and the OH groups in the low-molecular-weight polyol compound (d) which is a chain extender decreases, and therefore, the molecular weight distribution of the polyurethane-modified epoxy resin is also shifted to a low molecular weight side.

On the contrary, in a case where the proportion of the epoxy resin (a) incorporated is decreased, the amount of urethane prepolymer (P2) of which both terminals or a single terminal are sealed with the (n≥1) form in the epoxy resin (a) decreases, and therefore, the initial proportion of the urethane prepolymer (P1) of which terminals are still NCO groups increases. For this reason, the production amount of polyurethane produced by a reaction between the terminal NCO groups in the P1 and the OH groups in the low-molecular-weight polyol compound (d) which is a chain extender increases. Therefore, it is thought that the molecular weight distribution of the polyurethane-modified epoxy resin is also shifted to a high molecular weight side.

The epoxy resin (a) is preferably a liquid at normal temperature, and the epoxy equivalent is preferably 200 g/eq or less from the viewpoint thereof. In many cases, the epoxy resin (a) is a mixture of a monomer having a repeating number n of 0 and a polymer having a repeating number of 1 or more. The polymer has a secondary OH group produced by ring-opening of an epoxy group. Since this OH group is reactive with an NCO group in the polyisocyanate compound (c) or a terminal NCO group in the urethane prepolymer (P), the (n≥1) form in the epoxy resin (a) reacts with the NCO group in the polyisocyanate compound (c) or the terminal NCO group in the urethane prepolymer (P). The "(n=0) form", which has no OH group, does not participate in this reaction.

The ratio of the polyol compound (b) to the polyisocyanate compound (c) incorporated is set such that the molar ratio (b):(c) of OH groups in the polyol compound (b) to NCO groups in the polyisocyanate compound (c) is within a range of 1:2 to 1:30 to react the polyol compound (b) with the polyisocyanate compound (c). In a case where both the polyol compound (b) and the polyisocyanate compound (c) are bifunctional, the above-described molar ratio is coincident with the molar ratio of the polyol compound (b) to the polyisocyanate compound (c). By excessively increasing the proportion of the polyisocyanate compound (c) in the molar ratio of (b) to (c) incorporated as described above, a urethane prepolymer having a larger amount of isocyanate groups at both terminals thereof can be obtained. When the above-described molar ratio is as low as close to 1.0, the molecular weight of the urethane prepolymer produced excessively increases and the viscosity becomes too high. In addition, a urethane polymer having isocyanate at a single terminal thereof or a urethane polymer having OH groups at terminals thereof is easily produced. On the other hand, in a case where the molar ratio becomes too high, the molecular weight of a urethane prepolymer produced becomes too small. Therefore, there is a possibility that a modification effect such as plastic deformability or the like in cured product characteristics cannot be sufficiently exhibited, which is not preferable. By excessively increasing the molar proportion of the NCO group as described above, a urethane prepolymer of which both terminals are further modified is produced, and accordingly, urethane prepolymers (P2) having epoxy resins of n≥1 added to both terminals thereof are further obtained. For this reason, it is easy for these urethane prepolymers (P2) to be reliably introduced into a cross-linking portion during curing of an epoxy resin. Therefore, it is thought that a small amount of the urethane prepolymer (P2) improves the toughness.

The above-described molar ratio (b):(c) is preferably 1:3.10 to 1:20 and more preferably 1:3.30 to 1:1.20.

A polyol compound (b) having a number average molecular weight of 1,500 to 5,000 and an excellent compatibility with an epoxy resin (a) is preferable. Examples thereof include polyethylene glycols or polypropylene glycols which are obtained through ring-opening polyaddition of ethylene oxide or propylene oxide to polyhydric alcohols such as ethylene glycol or glycerin, but a polypropylene glycol represented by the Formula (2) shown above is preferable from the viewpoints of easy availability and good balance between the price and characteristics. In addition, the number of OH groups in the polyol compound (b) may be 2 or more, but is preferably 2.

A polypropylene glycol having a number average molecular weight of 1,500 to 5,000, preferably 2,000 to 3,000 is preferable as the polypropylene glycol from the viewpoint of securing favorable casting properties of a polyurethane-modified epoxy resin composition or favorable impregnation properties of the polyurethane-modified epoxy resin composition with respect to carbon fibers or glass fibers without thickening or semi-solidifying the composition.

A compound represented by the Formula (12) shown above is used as the above-described polyisocyanate compound (c), and $R_4$ in Formula (12) is a divalent group selected from Formulae (12a) to (12f). Moreover, a compound having excellent compatibility with the epoxy resin (a) is preferable.

Examples thereof include toluene diisocyanate (TDI), 4,4'-diphenylmethane diisocyanate (MDI), xylylene diisocyanate (XDI), hydrogenated xylylene diisocyanate (HXDI), isophorone diisocyanate (IPDI), and naphthalene diisocyanate, and MDI represented by the Formula (12a) shown above is preferable from the viewpoints of having a low molecular weight, low cost, safety, no thickening properties, and the like. The number of NCO groups in the polyisocyanate compound (c) may be 2 or more, but is preferably 2.

After obtaining a urethane prepolymer (P) in the presence of the epoxy resin (a), a polyurethane reaction is caused by incorporating a low-molecular-weight polyol compound (d) into the urethane prepolymer (P) so that a molar ratio (P):(d) of NCO groups in the urethane prepolymer (P) to OH groups in the low-molecular-weight polyol compound (d) is within a range of 0.9:1 to 1:0.9 to obtain the polyurethane-modified epoxy resin of the present invention.

The above-described low-molecular-weight polyol compound (d) has a number average molecular weight of less than 200, and specific examples thereof include polyhydric alcohols such as 1,4-butanediol and 1,6-pentanediol. The low-molecular-weight polyol compound (d) is preferably a diol having two OH groups and more preferably 1,4-butanediol from the viewpoints of easy availability and good balance between the price and characteristics. The low-molecular-weight polyol compound (d) is represented by the Formula (13) shown above. Here, $R_5$ is an alkylene group represented by Formula (13a), and g is a number of 1 to 10.

The low-molecular-weight polyol compound (d) may be used in such an amount that the NCO groups at terminals of the urethane prepolymer (P) and the OH groups in the low-molecular-weight polyol compound (d) have almost equimolar amounts. That is, since the polyol compound (b) and the low-molecular-weight polyol compound (d) have OH groups and the polyisocyanate compound (c) has NCO groups, it is preferable that the number of moles of the OH groups in (b)+(d) be approximately the same as the number of moles of the NCO groups in (c). The molar ratio is preferably within a range of 0.9:1 to 1:0.9. As the ratio of the number of moles of the OH groups to the number of moles of the NCO groups approaches 1, the molecular weight of polyurethane produced increases.

In the production method of the present invention, 68 to 92 weight %, preferably 70 to 90 weight %, of a bisphenol-based epoxy resin (a) is used based on a total amount of the epoxy resin (a), a middle- and high-molecular-weight polyol compound (b) having a number average molecular weight of 200 or larger, a polyisocyanate compound (c), and a low-molecular-weight polyol compound (d) as a chain extender having a number average molecular weight of less than 200, the middle- and high-molecular-weight polyol compound (b) and the polyisocyanate compound (c) are used in such amounts that a molar ratio (b):(c) of OH groups in (b) to NCO groups in (c) is within a range of 1:2 to 1:30, and the middle- and high-molecular-weight polyol compound is reacted with the polyisocyanate compound in the presence of the epoxy resin (a) (reaction 1). In this reaction 1, a reaction between the polyol compound (b) and the polyisocyanate compound (c) preferentially occurs to produce a urethane prepolymer (P1). Thereafter, a reaction between a part of the urethane prepolymer (P1) and the epoxy resin (a) occurs to mainly produce a urethane prepolymer (P2) of which both terminals are epoxidized, and a slight amount of a mixture of a urethane prepolymer (P2) of which a single terminal is epoxidized and a urethane prepolymer (P1) of which both terminals are still NCO is produced.

The above-described reaction between the urethane prepolymer (P1) and the epoxy resin (a) requires formation of a urethane bond by reacting the NCO groups with the poorly-reactive secondary OH groups of the (n=1) form in the epoxy resin (a), and therefore, the reaction temperature is preferably within a range of 80° C. to 150° C. and the reaction time is preferably within a range of 1 to 5 h.

Thereafter, the low-molecular-weight polyol compound (d) is added to the urethane prepolymer (P) so that a molar ratio (P):(d) of the NCO groups in the urethane prepolymer (P) to OH groups in the low-molecular-weight polyol compound (d) is within a range of 0.9:1 to 1:0.9 to cause a polyurethane reaction (reaction 2). Epoxy groups in the epoxy resin (n=0) form and the OH groups in the polyol compound (d) do not react with each other because the OH groups in the polyol compound (d) are alcoholic OH groups.

It is preferable that the reaction temperature of the reaction 2 be within a range of 80° C. to 150° C. and the reaction time of the reaction 2 be within a range of 1 to 5 h. However, the reaction 2 may have milder conditions than those of the reaction 1 because the reaction 2 is caused between the OH groups in the low-molecular-weight polyol compound (d) and the above-described NCO groups.

A catalyst can be used in the process of the above-described reactions (reactions 1 and 2) as necessary. This catalyst is used for sufficiently completing the formation of the urethane bond, and examples thereof include amine compounds such as ethylenediamine or tin compounds.

In the reaction 2, the slight amount of urethane prepolymer (P1) existing of which both terminals or a single terminal are NCO reacts with the low-molecular-weight polyol compound (d) to extend the chain length to form a polyurethane, and the urethane prepolymer (P2) of which both terminals are adducts of the (n≥1) forms in the epoxy resin (a) remains unreacted.

That is, the polyurethane-modified epoxy resin of the present invention is a mixture of a main component which is a resin component obtained by adding (n≥1) forms in an epoxy resin (a) to both terminals of a urethane prepolymer (P) and trace components which are a resin component which has an (n≥1) form in an epoxy resin (a) added to one single terminal of the urethane prepolymer (P) and of which the other single terminal is an NCO group and a resin component in which both terminals of a urethane prepolymer (P) are NCO groups, and an (n=0) form-component of an epoxy resin (a), and it is preferable that the epoxy equivalent be within a range of 180 to 1,000 g/eq and the viscosity at 120° C. be within a range of 0.1 to 20 Pa·s.

Hereinafter, reaction formulae when obtaining the polyurethane-modified epoxy resin of the present invention will be shown.

The following Formula 19 schematically illustrates one process for a urethane prepolymer as the above-described reaction 1. Urethane prepolymers (P) are produced by reacting the bisphenol-based epoxy resin (a) of mainly the (n=0) form and the (n=1) form, a middle- and high-molecular-weight polyol compound (b), and a polyisocyanate compound (c) with each other. Three kinds of a urethane prepolymer (C') of which both terminals are NCO groups, a urethane prepolymer (B') of which one terminal is an NCO group and which has a secondary hydroxyl group-containing epoxy resin of n=1 added to the other terminal thereof, and a urethane prepolymer (A') having a secondary hydroxyl group-containing epoxy resin of the (n=1) form added to both terminals thereof are produced as the urethane prepolymers (P). Because large excess amounts of polyisocyanate compound (c) and bisphenol-based epoxy resin (a) are used, it is thought that the urethane prepolymer (A') having a secondary hydroxyl group-containing epoxy resin of the (n=1) form added to both terminals thereof becomes a main product and the amounts of products of the urethane prepolymer (B') of which one terminal is an NCO group and which has a secondary hydroxyl group-containing epoxy resin of the (n=1) form added to the other terminal thereof and the urethane prepolymer (C') of which both terminals are NCO groups become very little. Among epoxy resins (a), the (n=0) form epoxy resin, which has no secondary hydroxyl group, does not participate in a reaction.

[C19]

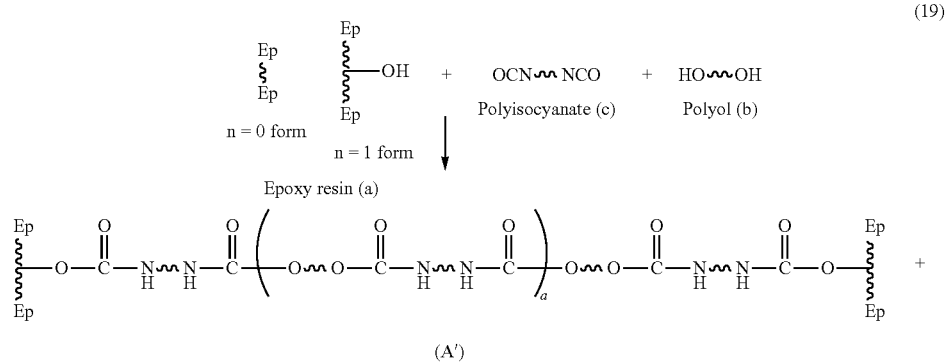

(19)

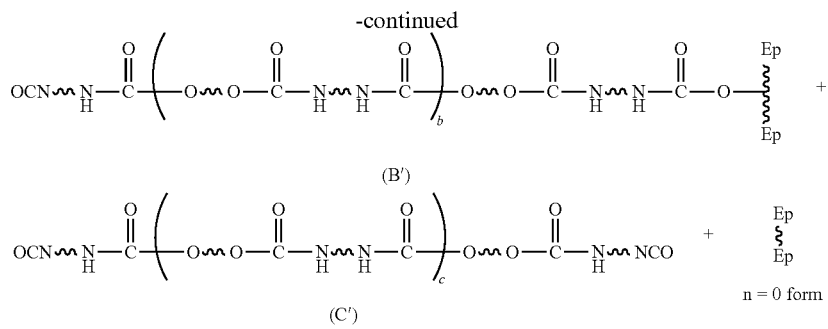

(B')

(C')

n = 0 form

The following Formula 20 schematically illustrates one process for a urethane prepolymer (a process for a polyurethane) as the above-described reaction 2. It is thought that, in a case where a low-molecular-weight polyol (d) is added to the mixture, which has been produced in the above-described reaction 1, of the urethane prepolymer (C') of which both terminals are NCO groups, the urethane prepolymer (B') of which one terminal is an NCO group and which has an (n=1) form epoxy resin added to the other terminal thereof, the urethane prepolymer (A') having an (n=1) form epoxy resin added to both terminals thereof, and an (n=0) form epoxy resin which has not participated in a reaction due to absence of a secondary hydroxyl group to cause a reaction, trace amounts of (B) and (C) are produced due to a reaction between the slight amount of (B') produced and a very small amount of the (C') component, (A') remains as it is and becomes (A) without participating in a reaction, and as a whole, the low-molecular-weight polyurethane (A) having epoxy resins added to terminals thereof is mainly produced. In this manner, it is thought that almost all polyurethanes become a mixture of the (n=0) form epoxy resin of and the low molecular urethane polymer (A) having the (n=1) form epoxy resins of added to both terminals thereof which is the same as the urethane prepolymer (A') having the (n=1) from epoxy resin of added to both terminals thereof, and products in which almost all urethanes are modified with epoxy resins are produced.

[C20]

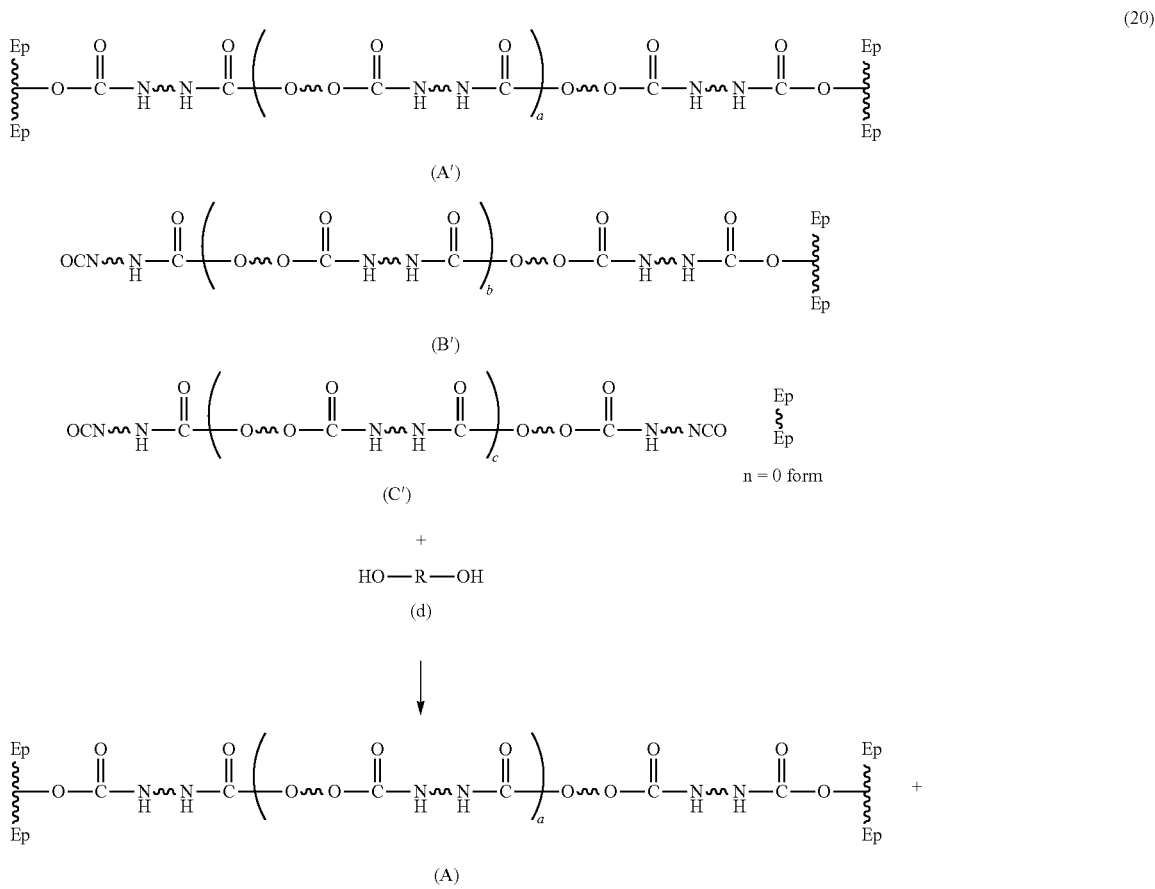

(20)

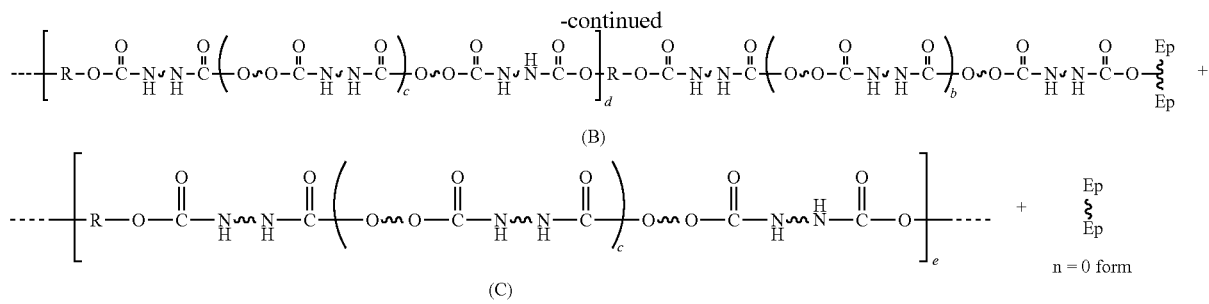

(B)

(C) n = 0 form

The polyurethane-modified epoxy resin composition of the present invention can be obtained by formulating a curing promoter (g), a curing agent (f), and a polyurethane-unmodified epoxy resin (e) as an adjuster of the concentration of polyurethane with the above-described polyurethane-modified epoxy resin. An inorganic filler such as calcium carbonate, talc, or titanium dioxide can be formulated with this resin composition as an extender or a reinforcing material as necessary.

A bisphenol A-type epoxy resin or a bisphenol F-type epoxy resin which is a liquid at normal temperature is preferable as the polyurethane-unmodified epoxy resin (e) from the viewpoints of easy availability and good balance between the price and characteristics.

By increasing or decreasing the formulation amount of polyurethane-unmodified epoxy resin (e), the concentration of polyurethane in a cured product of the polyurethane-modified epoxy resin composition can be increased or decreased. Here, the above-described concentration of polyurethane represents weight % of a polyol (b), polyisocyanate (c), and a low-molecular-weight polyol (d), which are polyurethane components, in a cured product.

That is, the concentration is calculated by the following equation.

Concentration of polyurethane={(b)+(c)+(d)}×100/{(a)+(b)+(c)+(d)+(e)+(f)+(g)}

Here, (a) to (g) are weights of corresponding components used.

In a case where the concentration of polyurethane in a cured product increases, cured product characteristics such as elongation at break, fracture toughness, and glass transition temperature change. In the case where the concentration of polyurethane increases, the elongation at break of a cured product tends to increase, the fracture toughness tends to increase, and the glass transition temperature tends to decrease.

In a case where a liquid-like bisphenol F-type epoxy resin is used as the polyurethane-unmodified epoxy resin (e), the formulation proportion of the bisphenol F-type epoxy resin in a composition is preferably set to 5 to 40 wt %, particularly set to 8 to 15 wt % so that the polyurethane modification rate (=concentration of polyurethane) in the cured product is within a range of 5 to 17 wt %. Accordingly, an elongation at break of the cured product of 2.5% or more is exhibited, fracture toughness of 1.5 MPa·m$^{0.5}$ or more is exhibited, and a glass transition temperature of 130° C. or higher is exhibited, thereby achieving excellent flexibility, toughness, and heat resistance at the same time.

Although a well-known curing agent for an epoxy resin can be used as the curing agent (f), dicyandiamide (DICY) is particularly preferable because it is easily available and it enables use of a single liquid so as to provide excellent storage stability.

Regarding the formulation amount of curing agent (f) in a case where the curing agent is DICY, the ratio of the number of moles of epoxy groups in all of epoxy resins including a polyurethane-modified epoxy resin and a polyurethane-unmodified epoxy resin (e) to the number of moles of active hydrogen groups in DICY is set to be within a range of 1:0.3 to 1:1.2, preferably 1:0.9 to 1:1.1 from the viewpoint of cured product characteristics.

Crystalline imidazole compounds such as 2,4-diamino-6-[2'-methylimidazolyl-(1')]-ethyl-s-triazine isocyanuric acid addition salts (2MA-OK) or urea compounds such as 3-(3,4-dichlorophenyl)-1,1-dimethylurea (DCMU) can be used as the curing promoter (g). The formulation amount of curing promoter (g) is preferably within a range of 0.1 to 5 wt % based on the total amount of the curing agent (f) and the total amount of epoxy resins including a polyurethane-modified epoxy resin and a polyurethane-unmodified liquid epoxy resin (e).

The polyurethane-modified epoxy resin composition of the present invention which has been obtained as described above does not impair workability such as casting properties into a mold or impregnation properties with respect to carbon fibers or glass fibers and fabrics thereof.

The cured product of the polyurethane-modified epoxy resin composition of the present invention can be obtained by performing any of processes of casting the above-described polyurethane-modified epoxy resin composition into a mold, impregnating the above-described polyurethane-modified epoxy resin composition with respect to carbon fibers or glass fibers and fabrics thereof, applying and adhering the above-described polyurethane-modified epoxy resin composition as an adhesive to an adherend, or applying the above-described polyurethane-modified epoxy resin composition to an object to be coated, and subsequently heating the above-described polyurethane-modified epoxy resin composition to a temperature of 80° C. to 200° C. which is then held for several hours.

The cured product of the polyurethane-modified epoxy resin composition of the present invention obtained in this manner has high fracture toughness having a fracture toughness value of 1.6 MPa·m$^{0.55}$ or more while maintaining high elongation at break of 2.5% or more in a tensile test, and has a high glass transition temperature of 110° C. or higher.

Furthermore, the cured product in which the low-concentration polyurethane-modified epoxy resin of the present invention, in which the epoxy resin (a) is used in an amount of 68 to 92 weight % based on the total amount of the components (a), (b), (c), and (d) for synthesis, is used is transparent.

EXAMPLES

Next, the present invention will be specifically described based on examples. Examples 1 to 7 and Reference Examples 1 to 4 relate to a polyurethane-modified epoxy resin, and Examples 8 to 15 and Comparative Examples 1 to 6 relate to a composition and a cured product thereof. The present invention is not limited to these specific examples, and various modifications or changes can be made without departing from the gist of the present invention.

Evaluation methods for the characteristics shown in the examples are as follows.

(1) Determination of presence or absence of residual NCO groups through IR: 0.05 g of the obtained polyurethane-modified epoxy resin was dissolved in 10 ml of tetrahydrofuran, the dissolved polyurethane-modified epoxy resin was then applied onto a KBr plate using a flat plate portion of a micro spatula and dried at room temperature for 15 minutes to evaporate the tetrahydrofuran, thereby preparing a sample for IR measurement. This sample was set in an FT-IR device Spectrum-One manufactured by PerkinElmer, Inc., and it was determined that there were no residual NCO groups in a case where a stretching vibration absorption spectrum at 2,270 $cm^{-1}$ which is a characteristic absorption band of NCO groups disappeared.

(2) Epoxy equivalent: Quantitatively determined according to JIS K 7236.

(3) Hydroxyl equivalent: 25 ml of dimethylformamide was placed in a 200 ml Erlenmeyer flask with a glass stopper, and a sample containing 11 mg/eq or less of hydroxyl groups was accurately weighed out, added thereto, and dissolved therein. 20 ml of a 1 mol/l phenyl isocyanate-toluene solution and 1 ml of a dibutyltin maleate solution each were added thereto with a pipette, the mixture was mixed well through shaking, sealed, and reacted for 30 to 60 minutes. After the completion of the reaction, 20 ml of a 2 mol/l dibutylamine-toluene solution was added thereto, and the mixture was mixed well through shaking, allowed to stand for 15 minutes, and reacted with excess phenyl isocyanate. Next, 30 ml of methyl cellosolve and 0.5 ml of a Bromocresol green indicator were added thereto, and excess amine was titrated with a standardized 1 mol/l methyl perchlorate cellosolve solution. The color of the indicator changes from blue to green and then to yellow. Therefore, the first endpoint of turning yellow was regarded as a final point, and the hydroxyl equivalent was obtained using the following Formulae i and ii.

$$\text{Hydroxyl equivalent}(g/eq) = (1{,}000 \times W)/C(S-B) \quad (i)$$

C: Concentration of 1 mol/l methyl perchlorate cellosolve solution (mol/l)
W: Amount (g) of sample
S: Titration amount (ml) of 1 mol/l methyl perchlorate cellosolve solution required for titration of sample
B: Titration amount (ml) of 1 mol/l methyl perchlorate cellosolve solution required for blank test during titration $$C = (1{,}000 \times w)/\{121 \times (s-b)\} \quad (ii)$$

w: Collection amount (g) of tris-(hydroxymethyl)-aminomethane weighed out for standardization
s: Titration amount (ml) of 1 mol/l methyl perchlorate cellosolve solution required for titration of tris-(hydroxymethyl)-aminomethane
b: Titration amount (ml) of 1 mol/l methyl perchlorate cellosolve solution required for blank test during standardization (4) Viscosity: The viscosity of a resin composition before curing at 25° C. was measured with an E-type viscometer.

(5) Glass transition temperature (Tg): About 10 mg of a cured product was collected in a dedicated aluminum pan, the differential thermal behavior within a range of 20° C. to 220° C. was measured with a temperature program including a first step in which the temperature was raised from 20° C. to 180° C. at a temperature rising rate of 10° C./min, a second step in which the temperature was held at 180° C. for 10 minutes, a third step in which the temperature was lowered from 180° C. to 20° C. at a temperature lowering rate of 150° C./min, a fourth step in which the temperature was held at 20° C. for 10 minutes, and a fifth step in which the temperature was raised from 20° C. to 220° C. at a temperature rising rate of 10° C./min, using a DSC, and Tg was calculated from an inflection point (extrapolation).

(6) Tensile test: a cured product molded into a shape of JIS K 6911 through mold casting was used as a test piece, a tensile test was performed using a universal tester under the conditions of a room temperature of 23° C. and a cross-head speed of 5 mm/min, and the elongation at break, the rupture strength, and the modulus of elasticity each were measured.

(7) Fracture toughness ($K_{1C}$): Measured according to a bending method of ASTM E-399 at room temperature of 23° C. and a cross-head speed of 0.5 mm/min.

(8) Appearance: Determined through visual observation.

Raw materials used are as follows.

Epoxy resin (a): Epothoto YDF-170 which is a bisphenol F-type epoxy resin manufactured by Nippon Steel & Sumikin Chemical Co., Ltd. and has an epoxy equivalent of 170 (g/eq) and a hydroxyl equivalent of 2,489 (g/eq)

Polyol (b): ADEKA Polyether P-2000 which is a polypropylene glycol manufactured by ADEKA Corporation and has an average molecular weight of 2,000 and a hydroxyl equivalent of 1,020 g/eq Polyisocyanate (c): Cosmonate PH which is 4,4'-diphenylmethane diisocyanate manufactured by Mitsui Chemicals, Inc.

Low-molecular-weight polyol (d): 1,4-butanediol (reagent)

Polyurethane-unmodified epoxy resin (e): Same as epoxy resin (a)

Curing agent (f): DICYANEX 1400F which is dicyandiamide manufactured by EVONIK

Curing promoter (g): Curezole 2MA-OK which is crystalline imidazole, 2,4-diamino-6-[2'-methylimidazolyl-(1')]-ethyl-s-triazine isocyanuric acid addition salt manufactured by Shikoku Chemicals Corporation

Example 1

A bisphenol F-type epoxy resin "Epothoto YD-170" as an epoxy resin (a) and a polypropylene glycol "ADEKA Polyether P-2000" as a polyol (b) were added to a 1,000 ml four-neck separable flask equipped with a nitrogen introduction pipe, a stirrer, and a temperature controller in the weights shown in Table 1 and were stirred and mixed with each other at room temperature for 15 minutes. Next, 4,4'-diphenylmethane diisocyanate "Cosmonate PH" was added to the same separable flask as polyisocyanate (c) in the weight shown in Table 1, and a reaction was caused at 120° C. for 2 h (reaction 1: a process for a urethane prepolymer). Thereafter, 1,4-butanediol was added to the same separable flask as a low-molecular-weight polyol (d) which is a chain extender in the weight shown in Table 1, and a reaction was caused at 120° C. for 2 h (reaction 2: polyurethane step) to obtain a polyurethane-modified bisphenol F-type epoxy resin 1. Here, the epoxy resin (a) was added at an amount of 70 weight % based on 100 weight % of the product of the reaction 2. In addition, the molar ratio (b):(c) of OH groups to NCO groups was 1:2.85. The completion of the reaction was checked through IR measurement from disappearance of the absorption spectrum of NCO groups. The epoxy equivalent of the obtained polyurethane-modified bisphenol F-type epoxy resin (resin 1) was 237 g/eq.

Example 2

A polyurethane-modified bisphenol F-type epoxy resin (resin 2) was obtained by performing reactions in the same procedure as in Example 1 except that the composition of raw materials added was as shown in Table 1.

Example 3

A polyurethane-modified bisphenol F-type epoxy resin (resin 3) was obtained by performing reactions in the same procedure as in Example 1 except that the composition of raw materials added was as shown in Table 1.

Example 4

A polyurethane-modified bisphenol F-type epoxy resin (resin 4) was obtained by performing reactions in the same procedure as in Example 1 except that the composition of raw materials added was as shown in Table 1.

Example 5

A polyurethane-modified bisphenol F-type epoxy resin (resin 5) was obtained by performing reactions in the same procedure as in Example 1 except that the composition of raw materials added was as shown in Table 1.

Example 6

A polyurethane-modified bisphenol F-type epoxy resin (resin 6) was obtained by performing reactions in the same procedure as in Example 1 except that the composition of raw materials added was as shown in Table 1.

Example 7

A polyurethane-modified bisphenol F-type epoxy resin (resin 7) was obtained by performing reactions in the same procedure as in Example 1 except that the composition of raw materials added was as shown in Table 1.

Reference Example 1

A polyurethane-modified bisphenol F-type epoxy resin (resin C1) was obtained by performing reactions in the same procedure as in Example 1 except that the composition of raw materials added was as shown in Table 1.

Reference Example 2

A polyurethane-modified bisphenol F-type epoxy resin (resin C2) was obtained by performing reactions in the same procedure as in Example 1 except that the composition of raw materials added was as shown in Table 1.

Reference Example 3

A polyurethane-modified bisphenol F-type epoxy resin (resin C3) was obtained by performing reactions in the same procedure as in Example 1 except that the composition of raw materials added was as shown in Table 1.

Reference Example 4

A polyurethane-modified bisphenol F-type epoxy resin (resin C4) was obtained by performing reactions in the same procedure as in Example 1 except that the composition of raw materials added was as shown in Table 1.

In Table 1, the formulation amount indicates g, and the values in parentheses indicates weight %. The concentration (wt %) of (a) indicates a concentration of epoxy resin (a) in each resin, the (b) OH groups: (c) NCO groups (molar ratio) indicates a molar ratio of OH groups in (b) to NCO groups in (c), and (a)(b)(c) NCO groups: (d) OH groups (molar ratio) indicates a molar ratio of NCO groups in a primary reactant to OH groups in (d).

TABLE 1

| | Example | | | | | | | Reference 1 | Reference 2 | Reference 3 | Reference 4 |
|---|---|---|---|---|---|---|---|---|---|---|---|
| | 1 | 2 | 3 | 4 | 5 | 6 | 7 | | | | |
| Epoxy resin (a) | 560 | 600.0 | 640.0 | 640.0 | 639.9 | 680 | 720.0 | 320.0 | 480.0 | 520.0 | 760.0 |
| | (70.0) | (75.0) | (80.0) | (80.0) | (80.0) | (85.0) | (90.0) | (40.0) | (60.0) | (65.0) | (95.0) |
| Polyol (b) | 174.8 | 137.9 | 113.9 | 101.9 | 89.9 | 66.0 | 29.8 | 376.8 | 245.4 | 209.8 | 1.05 |
| | (21.9) | (17.2) | (14.2) | (12.3) | (11.2) | (8.3) | (3.7) | (47.1) | (30.7) | (26.2) | (0.13) |
| Polyisocyanate (c) | 61.1 | 58.1 | 46.1 | 54.6 | 63.0 | 50.9 | 47.5 | 92.4 | 69.2 | 65.3 | 38.8 |
| | (7.6) | (7.3) | (5.8) | (6.8) | (7.9) | (6.4) | (5.9) | (11.5) | (8.7) | (8.2) | (4.85) |
| Low-molecular-weight polyol (d) | 4.1 | 4.0 | 0 | 3.6 | 7.2 | 3.1 | 2.8 | 10.8 | 5.4 | 4.9 | 0.17 |
| | (0.5) | (0.5) | (0) | (0.5) | (0.9) | (0.4) | (0.3) | (1.4) | (0.7) | (0.6) | (0.02) |
| Total g (weight %) | 800 | 800 | 800 | 800 | 800 | 800 | 800 | 800 | 800 | 800 | 800 |
| | (100) | (100) | (100) | (100) | (100) | (100) | (100) | (100) | (100) | (100) | (100) |
| Concentration (wt %) of (a) | 70 | 75 | 80 | 80 | 80 | 85 | 90 | 40 | 60 | 65 | 95 |

TABLE 1-continued

| | Example | | | | | | | Reference 1 | Reference 2 | Reference 3 | Reference 4 |
|---|---|---|---|---|---|---|---|---|---|---|---|
| | 1 | 2 | 3 | 4 | 5 | 6 | 7 | | | | |
| (b) OH groups:(c) NCO groups (molar ratio) | 1:2.85 | 1:3.44 | 1:3.30 | 1:4.00 | 1:4.37 | 1:6.29 | 1:13.0 | 1:2.00 | 1:2.30 | 1:2.54 | 1:300 |
| (a) (b) (c) NCO groups:(d) OH groups (molar ratio) | 1:1 | 1:1 | 1:1 | 1:1 | 1:1 | 1:1 | 1:1 | 1:1 | 1:1 | 1:1 | 1:1 |
| Epoxy equivalent (g/eq.) | 237 | 219 | 207 | 209 | 207 | 193 | 186 | 419 | 284 | 255 | 179 |

Next, examples of epoxy resin compositions and epoxy resin-cured products in which the above-described polyurethane-modified epoxy resins (resins 1 to 7 and resins C1 to C4) obtained in Examples 1 to 7 and Reference Examples 1 to 4 were used will be shown. Concurrently, the results are summarized in Table 2.

Example 8

The polyurethane-modified bisphenol F-type epoxy resin (resin 1) obtained in Example 1 as a polyurethane-modified epoxy resin (a), Epothoto YDF-170 as a polyurethane-unmodified epoxy resin (e), dicyandiamide as a curing agent (f), and 2MA-OK as a curing promoter (g) were added to a 300 ml dedicated disposable cup with the formulation shown in Table 2, and the mixture was stirred and mixed while performing vacuum defoaming for 20 minutes using a rotation/revolution vacuum planetary mixer for laboratory use to obtain a liquid resin composition. Here, 140 g of a polyurethane-modified bisphenol F-type epoxy resin composition having an epoxy group-to-dicyandiamide molar ratio of 1:0.5 and a polyurethane concentration in a cured product of 10 wt % was prepared. The viscosity of the obtained liquid resin composition at 25° C. was 19.5 Pa·s.

Next, this liquid resin composition was cast into a mold having six groove shapes with a test piece size for a tensile test of JIS K 6911 and a mold having six groove shapes of 100 mm length×4 mm wide×5 mm long for a fracture toughness test. The casting properties at this time were at a level at which casting could be performed with a sufficient margin. Next, the molds into which the resin was cast were placed in a hot-air oven and heat-cured at 120° C. for 45 minutes and further at 150° C. for 45 minutes to prepare epoxy resin-cured product test pieces.

The test results using these test pieces are shown in Table 2.

Examples 9 to 15

Each polyurethane-modified bisphenol F-type epoxy resin composition in which the concentration of polyurethane in a cured product was changed was prepared in the same manner as in Example 8 except that the formulation compositions of the polyurethane-modified epoxy resin (a), the polyurethane-unmodified epoxy resin (e), the curing agent (f), and the curing promoter (g) were as shown in Table 2. Next, the liquid resin compositions were mold cast and heat-cured in the same procedure as in Example 8 to prepare test pieces for characteristics evaluation.

The properties and test results of the obtained compositions are shown in Table 2.

Comparative Examples 1 to 6

Each polyurethane-modified bisphenol F-type epoxy resin composition was prepared in the same manner as in Example 8 except that the formulation compositions of the polyurethane-modified epoxy resin (a), the polyurethane-unmodified epoxy resin (e), the curing agent (f), and the curing promoter (g) were as shown in Table 2. Next, the liquid resin compositions were mold cast and heat-cured in the same procedure as in Example 8 to prepare test pieces for characteristics evaluation.

The properties and test results of the obtained compositions are shown in Table 2.

In Table 2, the formulation amount indicates g, and the values in parentheses indicates weight %. The viscosity represents a viscosity of a composition (before curing) at 25° C.

The compositions containing the low-viscosity urethane-modified epoxy resins of Examples 8 to 15 had both high heat resistance and fracture toughness compared to Comparative Examples 1 to 6. Accordingly, it became clear that the resins of Examples 8 to 15 were extremely useful as resins for advanced composite materials that require high fatigue resistance.

TABLE 2

| | Example | | | | | | |
|---|---|---|---|---|---|---|---|
| | 8 | 9 | 10 | 11 | 12 | 13 | 14 |
| Type of resin | 1 | 2 | 3 | 4 | 4 | 5 | 6 |
| Amount of resin | 46.7 | 56.0 | 70.0 | 70.0 | 105.0 | 70.0 | 93.3 |
| | (33.3 | (40.0 | (50.0 | (50.0 | (75.0 | (50.0 | (66.7 |
| YDF-170 | 82.1 | 72.7 | 58.7 | 58.8 | 24.2 | 58.7 | 35.3 |
| | (58.7 | (52.0 | (42.0 | (42.0 | (17.3 | (42.0 | (25.2 |
| Dicyandiamide | 7.1 | 7.2 | 7.2 | 7.1 | 6.8 | 7.2 | 7.3 |
| | (5.1) | (5.1) | (5.1) | (5.1) | (4.8) | (5.1) | (5.2) |

TABLE 2-continued

| | | | | | | | |
|---|---|---|---|---|---|---|---|
| 2MA-OK | 4.1 (2.9) | 4.1 (2.9) | 4.1 (2.9) | 4.1 (2.9) | 4.1 (2.9) | 4.1 (2.9) | 4.1 (2.9) |
| Total g (wt %) | 140 (100) | 140 (100) | 140 (100) | 140 (100) | 140 (100) | 140 (100) | 140 (100) |
| Concentration of polyurethane (wt %) | 10 | 10 | 10 | 10 | 15 | 10 | 10 |
| Viscosity (Pa · s) | 19.5 | 21.6 | 14.6 | 23.2 | 66.6 | 37.2 | 28.4 |
| Appearance | Opaque | Opaque | Opaque | Opaque | Opaque | Opaque | Opaque |
| Tg (° C.) | 134 | 133 | 134 | 133 | 134 | 133 | 133 |
| Tensile strength (MPa) | 52.6 | 63.6 | 23.5 | 67.6 | 52.5 | 69.3 | 75.1 |
| Tensile elongation at break (%) | 3.1 | 3.5 | 2.6 | 7.2 | 4.5 | 4.0 | 5.2 |
| Tensile elastic modulus (GPa) | 2.2 | 2.4 | 1.4 | 2.2 | 1.9 | 2.5 | 2.3 |
| Fracture toughness (MPa · m$^{0.5}$) | 2.03 | 2.12 | 1.96 | 1.87 | 1.62 | 2.33 | 2.29 |

| | Example | | | | | | |
|---|---|---|---|---|---|---|---|
| | 15 | Compa. Exa. 1 | Compa. Exa. 2 | Compa. Exa. 3 | Compa. Exa. 4 | Compa. Exa. 5 | Compa. Exa. 6 |
| Type of resin | 7 | | C1 | C2 | C3 | C4 | 4 |
| Amount of resin | 128.7 (91.9) | | 21.7 (16.7) | 35.0 (25.0) | 70.0 (50.0) | 128.4 (91.7) | 129.4 (92.4) |
| YDF-170 | | 128.0 (91.4) | 98.0 (75.3) | 93.8 (67.0) | 59.4 (42.4) | | |
| Dicyandiamide | 7.3 (5.2) | 7.9 (5.6) | 6.6 (5.1) | 7.1 (5.1) | 6.5 (4.7) | 7.5 (5.4) | 6.5 (4.6) |
| 2MA-OK | 4.1 (2.9) | 4.1 (2.9) | 3.8 (2.9) | 4.1 (2.9) | 4.1 (2.9) | 4.1 (2.9) | 4.1 (2.9) |
| Total g (wt %) | 140 (100) | 140 (100) | 140 (100) | 140 (100) | 140 (100) | 140 (100) | 140 (100) |
| Concentration of polyurethane (wt %) | 9.2 | 0 | 10 | 10 | 10 | 4.6 | 18.5 |
| Viscosity (Pa · s) | 40.6 | 4.1 | 18.4 | 19.3 | 20.2 | 10.2 | 115.3 |
| Appearance | Transparent | Opaque | Opaque | Opaque | Opaque | Opaque | Transparent |
| Tg (° C.) | 134 | 138 | 140 | 140 | 139 | 138 | 134 |
| Tensile strength (MPa) | 89.3 | 63.9 | 25.3 | 30.3 | 27.3 | 41.2 | 67.1 |
| Tensile elongation at break (%) | 5.7 | 2.4 | 1.4 | 1.7 | 1.6 | 2.3 | 4.9 |
| Tensile elastic modulus (GPa) | 2.9 | 3.2 | 1.9 | 1.9 | 2.1 | 1.8 | 2.4 |
| Fracture toughness (MPa · m$^{0.5}$) | 2.63 | 1.45 | 1.10 | 1.30 | 0.56 | 1.07 | 0.51 |

INDUSTRIAL APPLICABILITY

The low-concentration polyurethane-modified epoxy resin of the present invention is suitable for matrices for composite materials, adhesives, coating materials, electric and electronic materials, and the like.

The invention claimed is:

1. A low-concentration polyurethane-modified epoxy resin comprising a polyurethane having a bisphenol-based epoxy resin (a) represented by the following Formula (1) added to both terminals and/or a single terminal thereof,
wherein the epoxy resin (a) having an epoxy equivalent of 150 to 200 g/eq and a hydroxyl equivalent of 2,000 to 2,600 g/eq is modified with a middle- and high-molecular-weight polyol compound (b) having a number average molecular weight of 200 or larger, a polyisocyanate compound (c), and a low-molecular-weight polyol compound (d) as a chain extender having a number average molecular weight of less than 200, and
wherein it is obtained such that the epoxy resin (a) is used in an amount of 68 to 92 weight % based on a total amount of the components (a), (b), (c), and (d), the middle- and high-molecular-weight polyol compound (b) and the polyisocyanate compound (c) are used in such amounts that a molar ratio of OH groups in the component (b) to NCO groups in the component (c) is within a range of 1:2 to 1:30 and are reacted with each other in the presence of the epoxy resin (a) to produce a urethane prepolymer (P), and then, the low-molecular-weight polyol compound (d) is added to the urethane prepolymer (P) so that a molar ratio of NCO groups in the urethane prepolymer (P) to OH groups in the low-molecular-weight polyol compound (d) is within a range of 0.9:1 to 1:0.9 to cause a polyurethane reaction,

[C1]

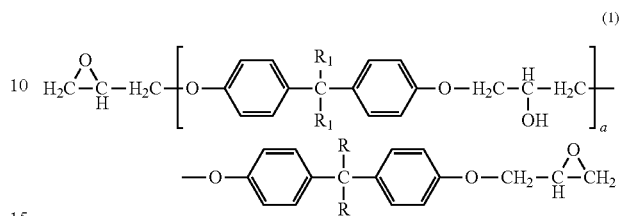

where, R and $R_1$ each independently represent H or a methyl group, and a is a number of 0 to 10.

2. An epoxy resin composition obtained by formulating a polyurethane-unmodified epoxy resin (e), a curing agent (f), and a curing promoter (g) with the low-concentration polyurethane-modified epoxy resin according to claim 1,
wherein a weight concentration of polyurethane components is 5.0 to 17.0 weight %.

3. The epoxy resin composition according to claim 2, wherein the curing agent (f) is dicyandiamide.

4. An epoxy resin-cured product obtained by curing the epoxy resin composition according to claim 2.

5. An epoxy resin-cured product obtained by curing the epoxy resin composition according to claim 3.

* * * * *